(12) United States Patent
Fagan et al.

(10) Patent No.: US 11,873,613 B2
(45) Date of Patent: Jan. 16, 2024

(54) LIGHTWEIGHT MOLDED COVER (71) Applicant: Hubbell Incorporated, Shelton, CT (US)

(72) Inventors: Lemuel David Fagan, Lenoir City, TN (US); Keith Alden Chudley, Knoxville, TN (US); Ernest Stephen Forsten, Fleming Island, FL (US); Jason David Estes, Knoxville, TN (US)

(73) Assignee: HUBBELL INCORPORATED, Shelton, CT (US)

( * ) Notice: Subject to any disclaimer, the term of this patent is extended or adjusted under 35 U.S.C. 154(b) by 641 days.

(21) Appl. No.: 16/352,165

(22) Filed: Mar. 13, 2019

(65) Prior Publication Data

US 2019/0284778 A1 Sep. 19, 2019

Related U.S. Application Data (60) Provisional application No. 62/643,532, filed on Mar. 15, 2018.

(51) Int. Cl.
*E02D 29/14* (2006.01)
*B32B 27/12* (2006.01)
(Continued)

(52) U.S. Cl.
CPC .......... *E02D 29/1454* (2013.01); *B29C 70/48* (2013.01); *B29C 70/546* (2013.01);
(Continued)

(58) Field of Classification Search
CPC .......... B32B 5/02; B32B 21/10; B32B 15/14; B32B 9/047; B32B 3/08; B32B 2262/101;
(Continued)

(56) References Cited

U.S. PATENT DOCUMENTS 2,558,580 A   6/1951  Pomykala
3,450,593 A * 6/1969  Fossier .................. B29C 70/00
                                               428/73
(Continued)

FOREIGN PATENT DOCUMENTS

CA   2880548 A1 *  2/2014  .............. C08J 5/005
CN   2372371         4/2000
(Continued)

OTHER PUBLICATIONS

[NPL-1] "End Grain Balsa Core"; Easy Composites (Apr. 21, 2021), <https://www.easycomposites.co.uk/end-grain-balsa>. (Year: 2021).*

(Continued)

*Primary Examiner* — David Sample
*Assistant Examiner* — Donald M Flores, Jr.
(74) *Attorney, Agent, or Firm* — Wissing Miller LLP (57) ABSTRACT

Disclosed is a cover for a utility vault and a method for making such covers. The cover is formed from fiberglass reinforcement layers, a low-density core, and a polymer mix matrix. The reinforcement layers include a bottom reinforcement layer, one or more edge reinforcement layers, and a top reinforcement layer. A first portion of the edge reinforcement layer overlaps a portion of the bottom reinforcement layer and a second portion of the edge reinforcement layer overlaps a portion of the top reinforcement layer. The core is positioned between the top and bottom reinforcement layers. The reinforcement layers are formed from fiberglass fabric and may include fiberglass layers whose fibers are oriented quadraxially. The polymer mix impregnates the fabric layers, encases the core, and binds the components together. The polymer matrix includes a thermoset polymer resin.

12 Claims, 11 Drawing Sheets

(51) Int. Cl.

| | | |
|---|---|---|
| *B32B 27/36* | (2006.01) | |
| *B32B 27/20* | (2006.01) | |
| *B32B 3/08* | (2006.01) | |
| *B29C 70/48* | (2006.01) | |
| *B29C 70/54* | (2006.01) | |
| *B32B 9/04* | (2006.01) | |
| *B32B 15/14* | (2006.01) | |
| *B32B 21/10* | (2006.01) | |
| *B32B 3/12* | (2006.01) | |
| *B32B 5/02* | (2006.01) | |
| *B32B 5/12* | (2006.01) | |
| *B29L 31/00* | (2006.01) | |
| *B29K 309/08* | (2006.01) | |
| *B29K 67/00* | (2006.01) | |
| *B29K 509/08* | (2006.01) | |

(52) U.S. Cl.
CPC .............. *B32B 3/08* (2013.01); *B32B 3/12* (2013.01); *B32B 5/02* (2013.01); *B32B 5/12* (2013.01); *B32B 9/047* (2013.01); *B32B 15/14* (2013.01); *B32B 21/10* (2013.01); *B32B 27/12* (2013.01); *B32B 27/20* (2013.01); *B32B 27/36* (2013.01); *E02D 29/1472* (2013.01); *B29K 2067/06* (2013.01); *B29K 2309/08* (2013.01); *B29K 2509/08* (2013.01); *B29K 2995/0063* (2013.01); *B29L 2031/724* (2013.01); *B32B 2262/101* (2013.01); *B32B 2264/101* (2013.01); *B32B 2307/72* (2013.01); *E02D 2200/1628* (2013.01); *E02D 2250/0007* (2013.01); *E02D 2300/0006* (2013.01); *E02D 2300/0026* (2013.01); *E02D 2300/0046* (2013.01); *E02D 2300/0071* (2013.01); *E02D 2300/0075* (2013.01); *Y10T 428/24124* (2015.01); *Y10T 428/24785* (2015.01)

(58) Field of Classification Search
CPC ........ E02D 29/1472; E02D 2300/0006; E02D 2300/0075; E02D 2300/0071; E02D 2300/0026; E02D 2300/0046; Y10T 428/24124
See application file for complete search history.

(56) References Cited

U.S. PATENT DOCUMENTS

| | | | |
|---|---|---|---|
| 3,974,599 A | 8/1976 | Grosh | |
| 4,726,707 A | 2/1988 | Newton | |
| 5,034,256 A * | 7/1991 | Santiso, III | ............... B32B 7/12 428/116 |
| 5,139,845 A * | 8/1992 | Beckerman | ............ B32B 27/38 428/119 |
| 6,656,405 B1 | 12/2003 | Debergh | |
| 7,361,834 B1 | 4/2008 | Trangsrud | |
| 7,484,909 B2 | 2/2009 | Brady | |
| 7,914,227 B2 | 3/2011 | Jordan | |
| 8,727,659 B1 * | 5/2014 | Reynolds | ................ E02D 29/14 404/25 |
| 8,979,421 B2 | 3/2015 | Jang | |
| 9,676,118 B2 | 6/2017 | Mathieu | |
| 10,280,587 B2 | 5/2019 | Nachyla | |
| 2006/0024482 A1 * | 2/2006 | Stachurski | .............. B32B 27/12 428/292.1 |
| 2009/0072978 A1 | 3/2009 | Tilson | |
| 2010/0062238 A1 | 3/2010 | Doyle et al. | |
| 2010/0264274 A1 | 10/2010 | Bradley | |
| 2010/0276542 A1 | 11/2010 | Rouyre | |
| 2015/0079356 A1 | 3/2015 | Mathieu | |
| 2015/0210512 A1 | 7/2015 | Kawasaki | |
| 2015/0252549 A1 * | 9/2015 | Lane | ....................... E02D 29/12 404/26 |
| 2016/0069039 A1 | 3/2016 | Johnson et al. | |
| 2017/0023046 A1 * | 1/2017 | Lemacks | ............... F16B 5/0225 |
| 2017/0189819 A1 | 7/2017 | Chen | |
| 2018/0163361 A1 | 6/2018 | Nunnery | |
| 2019/0218743 A1 | 7/2019 | Mercade et al. | |
| 2019/0254438 A1 | 8/2019 | Rose | |
| 2019/0257086 A1 | 8/2019 | Pfaff | |
| 2019/0323199 A1 | 10/2019 | Hensel | |

FOREIGN PATENT DOCUMENTS

| | | | | |
|---|---|---|---|---|
| DE | 102009009431 A1 * | 8/2010 | ............ B32B 17/04 |
| JP | 2009220279 A * | 10/2009 | |

OTHER PUBLICATIONS

[NPL-2] Akabori (JP 2009/220279 A); Oct. 2009, (EPO machine translation to English). (Year: 2009).*

[NPL-3] Feile (DE 102009009431 A1), Aug. 19, 2010 (EPO—machine translation to English). (Year: 2010).*

Colan Australia. Quadraxial. Feb. 27, 2015. [online] Retrieved from the Internet <URL: 13-14 https://web.archive.org/web/20150227152752/http://www.colan.com.au/compositereinforcement/stitched/quadraxial.html>; first page.

Quazite. "ANSI Tier" Selection and Placement in Non-Deliberate Vehicular Traffic Applications. Feb. 2014. [online] Retrieved from the Internet <URL: http://comstarcity.com/files/datasheets/QUAZITE-CATALOG-2014-HPS%20QZ-1 B.pdf>; p. 16.

International Search Report and Written Opinion mailed in PCT/US19/20353 dated Jun. 20, 2019.

Scott Bader Crystic 491-491PA Data Sheet; Thixotropric Isophthalic Poyester Resin with Good Water and Chemical Resistance, Feb. 2013.

* cited by examiner

LIGHTWEIGHT MOLDED COVER

This application claims priority under 35 U.S.C. § 119 to U.S. Provisional Patent Application No. 62/643,532, filed on Mar. 15, 2018. The disclosure of that application is incorporated herein by reference.

BACKGROUND

Field

The present disclosure relates to covers for utility vaults, trenches, and other in-ground structures and to methods for forming such covers. More particularly, the present disclosure relates to lightweight covers formed from a lightweight core, fiberglass reinforcements, and a polymer matrix and methods for forming such covers.

Description of the Related Art

Equipment for utilities, such as transformers, switches, control panels, and valves are often housed in vaults located underground. Such vaults include an opening at the top to allow workers to access the equipment either by reaching down through the opening, or for larger vaults, allowing workers to descend into the vault. The opening must be covered to protect the equipment from weather and from unauthorized access. Vault covers are generally shaped to conform to a collar formed at the top of the vault surrounding the opening. The cover fits into the collar and may be secured to the top of the vault by bolts. The cover is supported at its edges by the collar.

Cables, pipes and electrical conduits are also housed in structures underground. Trenches holding these elongated objects often cross trafficked areas, such as sidewalks and roadways. Generally, trenches are lined with a trench liner. A trench cover is removably fitted to the top of the trench liner to provide safe passage for pedestrians and vehicles over the trench.

The cover of many vaults and trenches lies at ground level to provide a continuous surface with the surrounding area. For example, a vault may be located below a pedestrian sidewalk. To avoid a tripping hazard, the vault or trench cover needs to be substantially flush with the surrounding sidewalk. Likewise, the cover of a vault or trench located below a roadway must be substantially co-planar with the road to allow vehicles to pass. Because the cover is flush with the ground, it may be subject to heavy loads, such as when a vehicle drives over the cover. To avoid damage, covers need to be strong enough to withstand the maximum load expected for a particular situation.

Repair of structures beneath a roadway may require that a hole be formed in the road. To provide safe passage of vehicles, such holes are typically covered with a road plate. Known road plates are generally formed from a high strength material such as steel. Plates with sufficient thickness to support vehicle traffic and that are large enough to span holes necessary to repair underground structures are heavy, usually requiring motorized equipment such as a back hoe, to deliver, install, and remove them.

Trench covers span the opening at the top of a trench and are supported along their edges, usually by shoulders formed along the top edges of the trench liner. Generally, multiple trench covers are positioned end to end to cover a trench. One or both ends of each of the covers is usually not supported, since any support structure spanning the top of the trench might interfere with cables, conduits, and pipes being dropped into the trench. Trench covers must be strong enough to withstand downward force exerted by vehicles that drive across the trench despite lacking support on their ends.

Known covers are typically made from moldable materials, such as concrete. The concrete forming such covers is a mixture of a cement and a mineral aggregate. The cement may be a thermoset polymer resin. The aggregate may be a combination of mineral materials with components of various sizes from sand to small gravel. Because concrete may have low tensile strength, known covers may include strengthening members such as rebar to withstand tensile loads.

Covers for utility vaults and other underground structures need to be removed from time to time to allow workers to access equipment in the vault or to work in the underground structures. Typically, covers include a handle or lifting pin that can be grasped by the worker. A single worker may be able to lift a small cover without tools. For larger covers, such as those that allow a worker to bodily enter the vault, or for road plates, the weight of the cover may prevent the worker from lifting it himself. The worker may need to bring a tool, such as a cover lifter or heavy equipment such as a backhoe, to remove the cover. This adds cost and complexity to the task of servicing equipment in the vault or trench. If lighter materials are used to form the cover, such as by using thinner rebar, or using less of the aggregate, the strength of the cover may be reduced.

Thus, there is a need for covers for trenches, utility vaults, and other in-ground structures that provides high strength to resist loads, while at the same time having less weight than known covers to facilitate convenient access.

SUMMARY

The present disclosure relates to apparatuses and methods to address these difficulties.

According to one embodiment there is provided a method for forming a cover for an underground structure comprising the steps of providing a mold cavity, placing an edge reinforcement along at least one side of the mold cavity with a first portion of the edge reinforcement proximate a bottom surface of the mold cavity, placing a top reinforcement layer proximate the bottom surface of the mold cavity, wherein one of the top reinforcement layer and the first portion of the edge reinforcement overlies the other, placing a core in the mold cavity above the top reinforcement layer, placing a bottom reinforcement above the core, folding a second portion of the edge reinforcement over the core, wherein one of the bottom reinforcement layer and the second portion of the edge reinforcement overlies the other, and introducing a polymer mix into the mold cavity. According to one aspect the step of introducing comprises pouring the polymer mix into the mold cavity. According to another aspect, one or more of the top reinforcement layer, the bottom reinforcement layer and the edge reinforcement layer are a fiberglass fabric. The fiberglass fabric may comprise a quadraxial fabric. The core may comprise a low-density material and may be a material selected from one or more of balsa wood, expanded polymer foam, and a metal or polymer honeycomb. According to another aspect, the core is comprised of a plurality of components and wherein the step of placing the core in the mold cavity comprises arranging the components in the cavity. According to another aspect, the method further comprises providing one or more inlet ports and outlet ports to the mold cavity, placing a first infiltration mat in the mold cavity below the core, placing a second infiltration mat in the mold cavity above the core, closing the mold cavity, applying a vacuum to the outlet port, and supplying a source of resin to the inlet port. The step of introducing may comprise injection molding, Light Resin Transfer Molding (LRTM), Resin Transfer Molding (RTM), or vacuum bag molding.

According to another embodiment of the disclosure, a cover is described comprising, a bottom reinforcement layer, at least one edge reinforcement layer, a core, a top reinforcement layer, wherein the core is positioned between the bottom reinforcement layer and the top reinforcement layer, and a polymer resin matrix, wherein one of a first portion of the edge reinforcement layer and a portion of the top reinforcement layer overlaps the other and wherein one of a second portion of the edge reinforcement layer and a portion of the bottom reinforcement layer overlaps the other. According to an aspect of the embodiment, one or more of the top reinforcement layer, the bottom reinforcement layer and the edge reinforcement layer are a fiberglass fabric. The fiberglass fabric may comprise a quadraxial fabric. According to another aspect the core comprises a low-density material. The material may be selected from one or more of balsa wood, expanded polymer foam, and a metal or polymer honeycomb. According to another aspect, the core comprises a high R-value material to provide thermal insulation. The cover may form one or more of a trench cover, a vault cover, a manhole cover, and a road plate. The cover may include a lifting pin or lifting handle.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 2b-2f are cross sections of a portion of a mold illustrating steps for forming the cover of FIG. 2a;

FIG. 3 shows a cross sectional view of a portion of the cover formed of FIG. 2a;

FIGS. 6b-6f are cross sections of a portion of a mold illustrating steps for forming the cover of FIG. 6a.

DETAILED DESCRIPTION

Figures 1, 2A:
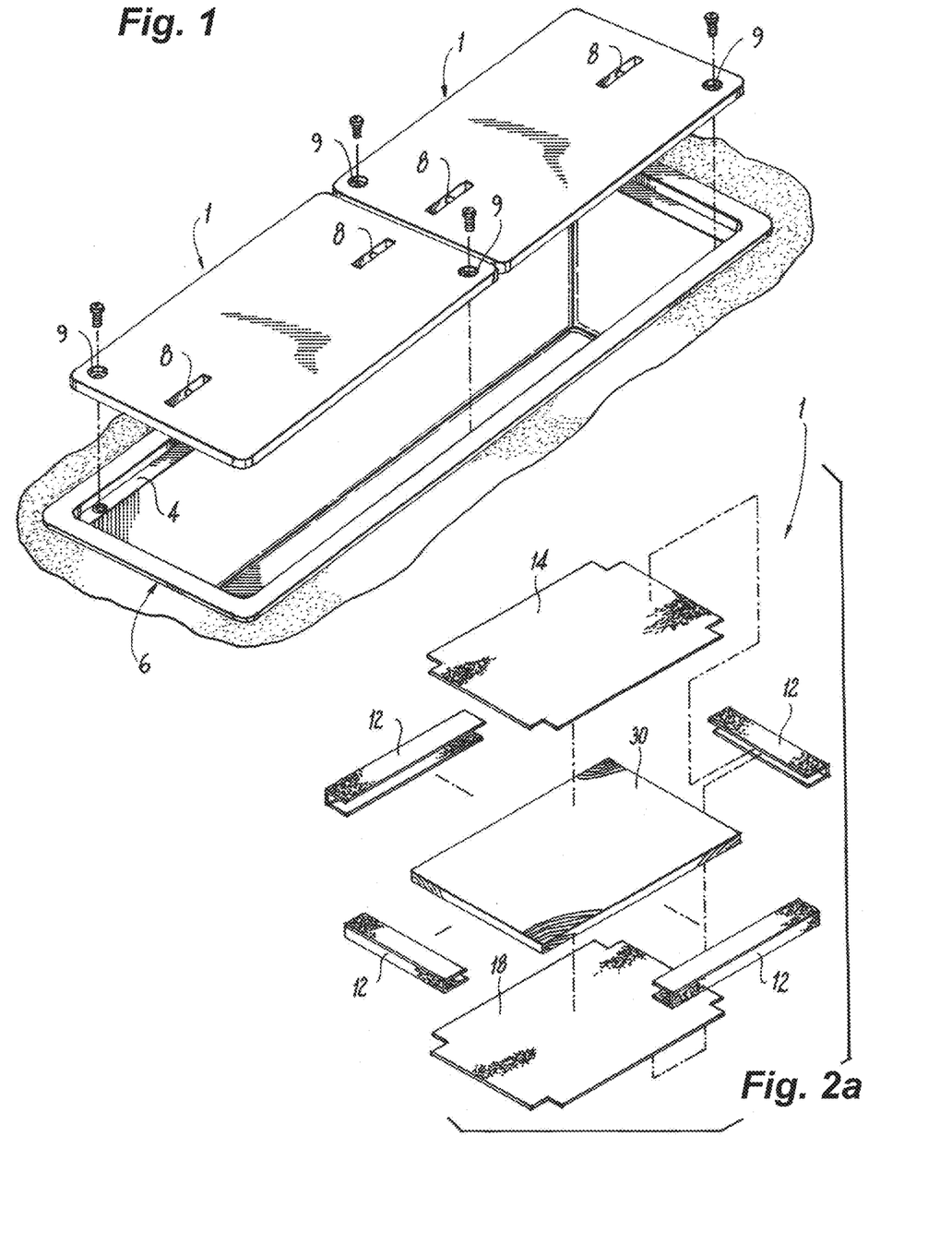
FIG. 1 is a perspective view of trench including a trench cover according to an embodiment of the disclosure.
FIG. 2a is an exploded view of a cover according an embodiment of the disclosure.

FIG. 1 shows a trench lined with a trench liner 6 and covered with covers 1 according to an embodiment of the disclosure. Trench liner 6 is designed to be installed below ground, for example, beneath a roadway, a sidewalk, or a lawn with the cover 1 flush with the ground surface. The top edges of the trench liner 6 include shoulders 4. One or more trench covers 1 are adapted to fit over the trench with their respective edges supported by shoulders 4. According to one aspect of the disclosure, instead of being supported by shoulders, cover 1 spans the trench and is supported by the ground surface on either side of the trench. Cover 1 may include lifting handles or lifting pins 8.

Bolts may be provided in bolt holes 9 to secure cover 1 onto collar 4. Bolts may have a security feature such as a head requiring a specialized tool, for example, a pentagonal shape, to discourage unauthorized persons from tampering with the vault or its contents. Cover 1 may have a textured top surface to increase friction and reduce the chance that a person may slip when walking across the cover. Cover 1 may also include indicia to indicate the type of contents within the trench or vault.

According to another embodiment, cover 1 forms a road plate for covering a hole in a road bed, for example, while repair work is done on structures beneath the surface of a road. According to one aspect, the road plate is provided with beveled edges so that vehicles can easily roll onto and off of the road plate. Edges of the road plate are supported by the road surface surrounding the hole.

According to another embodiment, cover 1 is a cover for a utility vault. The cover of this embodiment is shaped to fit within the collar of a vault for holding equipment, such as electrical connections, switches, transformers, valves, meters, and the like.

According to another embodiment, cover 1 can be round and suitably shaped to cover a manhole.

FIG. 2a shows an exploded view of a cover 1 according to an embodiment of the disclosure. Top reinforcement 14 and bottom reinforcement 18 are adjacent to respective top and bottom surfaces of core 30. Edge reinforcements 12 cover the edges of core 30 and also overlap the edges of the top and bottom reinforcements. When cover 1 is assembled these components are embedded in a polymer resin matrix.

Figure 2B:
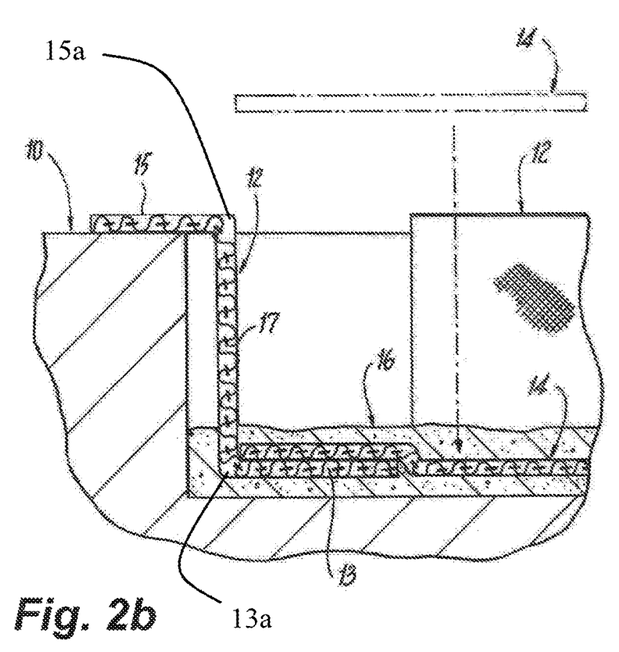

FIGS. 2b-2f are cross sectional views of a portion of a mold 10 illustrating steps to form cover 1. A variety of cover shapes and sizes can be formed by varying the size and shape of the mold cavity 10. As shown in FIG. 2b, a first portion 16 of a polymer resin mixture is poured into the mold cavity. Edge reinforcement 12 is placed in the mold with a first portion 13 along the bottom of the mold 10 and a second portion 15 resting on an outer surface of the mold. A first fold 13a connects first portion 13 with middle portion 17 of edge reinforcement layer 12. Top reinforcement 14 is placed into the mold and overlaps the first portion 13 of edge reinforcement. Top reinforcement extends across the bottom surface of the mold cavity and covers substantially the whole of the bottom surface of the mold cavity. The polymer resin wets the top reinforcement 14 and portion 13 of the edge reinforcement. When the polymer resin solidifies, as described below, it creates a bond between portion 13 of the edge reinforcement and top reinforcement 14.

According to one embodiment, features of cover 1 such as handles or lifting pins 8, bolt holes 9, indicia, and/or texturing on the finished part are formed by the shape and texture of the bottom surface of the mold cavity 10. Where the shape of the bottom surface of the mold cavity extends substantially upward from the bottom of the mold, for example, to form handles 8 and bolt holes 9, top reinforcement 14 is cut to fit around these features.

According to one embodiment, edge reinforcement 12 and top reinforcement 14 are formed from a fiberglass fabric, such as a woven roving or a biaxial or triaxial fiberglass fabric. According to a preferred embodiment, the fabric is a quadraxial fiberglass fabric with fibers aligned in separate layers offset from one another by 0°, 90°, −45°, +45°. The layers may be stitched to one another using, for example, polyester stitching at 1-inch intervals. According to a preferred embodiment, the fiberglass fabric is a 48 oz. per square yard quadraxial fiberglass fabric manufactured by Flotex™ and sold under part number E-LHXF-4800. Such fabrics have an open structure, allowing liquids, such as the polymer resin mixture, to readily infiltrate between the fiberglass fibers and wet the fibers. According to one embodiment, the surface of the fibers is chemically or mechanically treated to be readily wetted by the resin and to securely bond with the resin once it hardens.

Figure 2C:
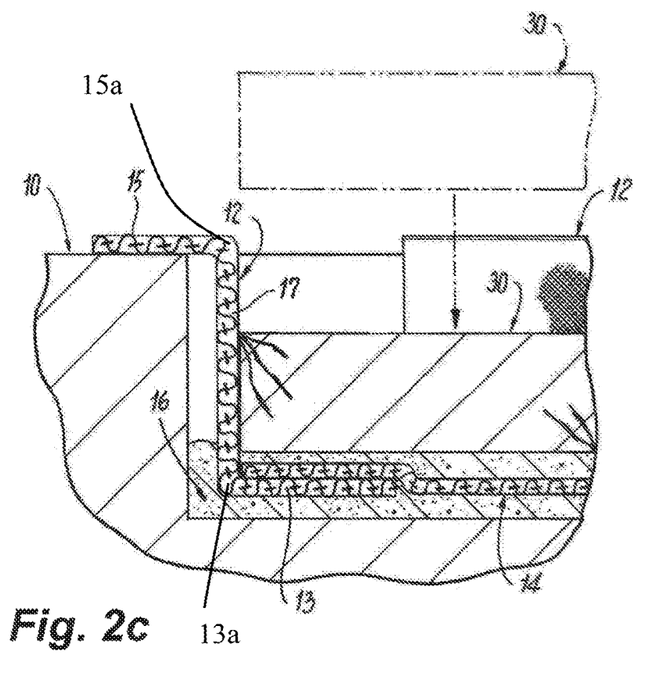

As shown in FIG. 2c, a core 30 is placed into the mold 10. The core 30 is shaped to substantially conform to the perimeter of the mold with a predetermined clearance from the sides of the mold. A middle portion 17 of edge reinforcement 12 contacts the edges of core 30. Core 30 is pressed into the resin 16 so that it presses against top reinforcement 14.

Core 30 may be formed from a low-density material, such balsa wood, plywood, oriented strand board, polyurethane, polyethylene terephthalate (PET), an expanded polymer foam (e.g. Styrofoam), honeycombed materials such as aluminum honeycomb, polypropylene honeycomb, composite materials such as fly ash in an epoxy matrix, and the like. According to a preferred embodiment, core 30 is formed from end grain balsa with a density between 9 and 15 pounds per cubic foot. According to a most preferred embodiment, core 30 is formed from end grained balsa with a density of 15 pounds per cubic foot that has been predrilled to facilitate incorporation of the resin into the bulk of the core. According to a further embodiment, core 30 is fabricated from a plurality of polymer, metal, ceramic, or other components to create a hollow, high-strength structure.

Where core 30 is made from a material that provides a high R-value, for example, expanded Styrofoam, the cover may provide enhance the thermal insulation for the contents of a vault or trench.

Figure 2D:
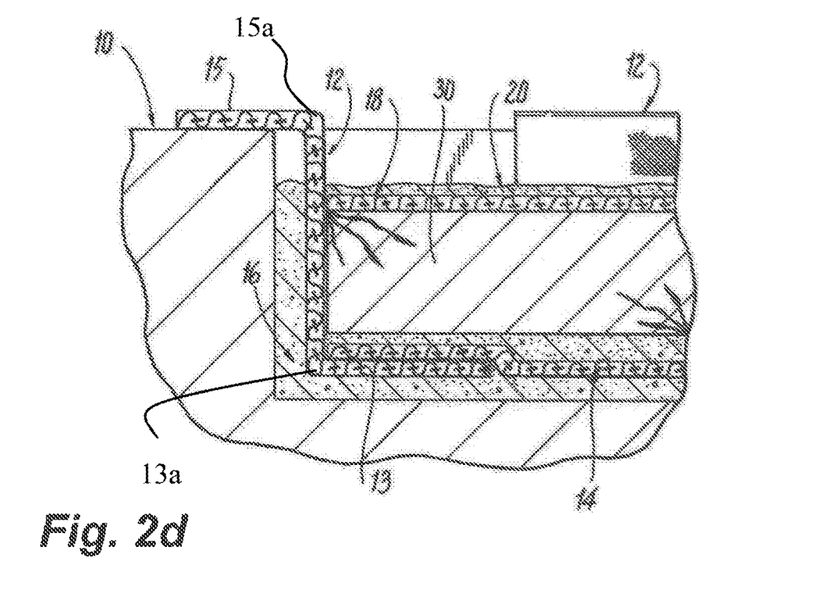

As shown in FIG. 2d, bottom reinforcement 18, which may be a fiberglass fabric, is placed in the mold on top of core 30. According to a preferred embodiment, bottom reinforcement 18 is formed from the same quadraxial fiberglass fabric that forms the edge reinforcement 12 and top reinforcement 14. A second portion 20 of polymer resin mixture is poured into the mold cavity 10. The resin mixture infiltrates the bottom reinforcement and portions of the edge reinforcement and flows into any openings in core 30, such as predrilled holes.

Figure 2E:
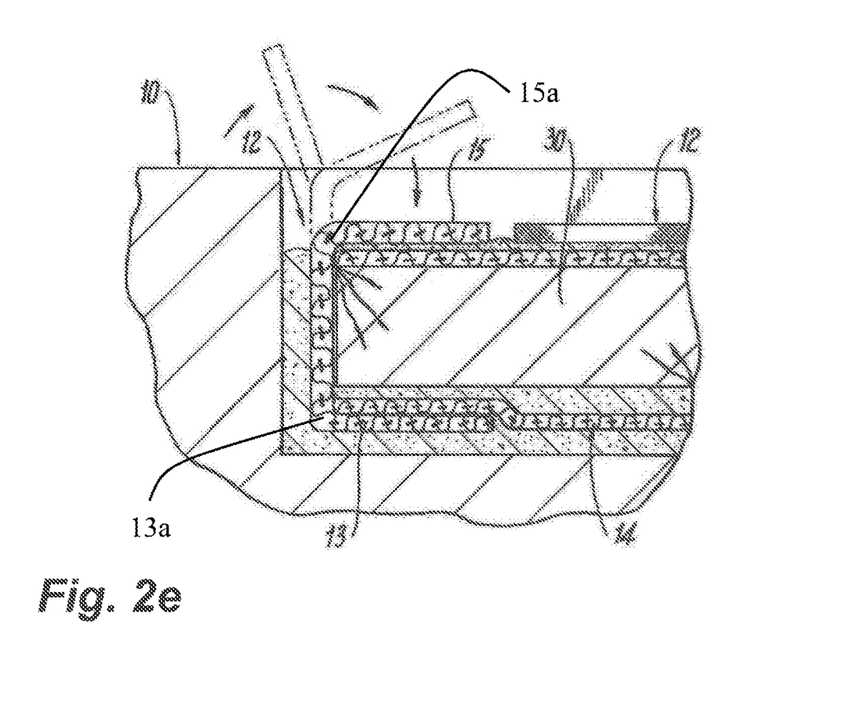

As shown in FIG. 2e, portion 15 of reinforcement 12 is folded over bottom reinforcement 18, creating second fold 15a where second fold 15a connects the second portion with the middle portion. In an alternative embodiment to what is shown in FIG. 2e, portion 15 is folded into the mold cavity before the bottom reinforcement 18 is placed into the cavity. This embodiment differs from what is shown in FIG. 2e in that portion 15 of the edge reinforcement lies directly on the core and the bottom layer 18 overlies the second portions 15 of the edge reinforcement.

Figure 2F:
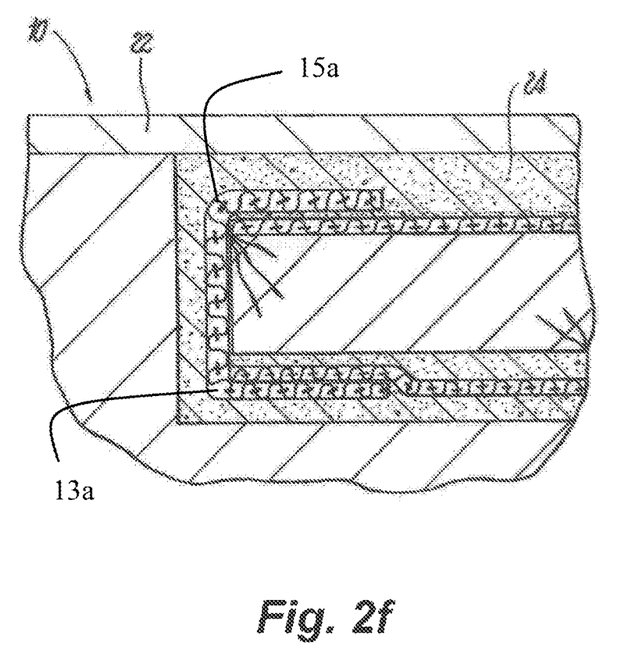

As shown in FIG. 2f, a third portion 24 of resin mixture is poured into the mold cavity 10 to fill the cavity. When the resin mixture hardens it will form a bond between bottom reinforcement 18 and edge reinforcement 12 as well as to form a bond between each of the reinforcements 12, 14, 18 and core 30. As shown in FIG. 2f, according to one embodiment a top portion of mold 22 is closed over the cavity 10. Force may be applied to the top 22 by a mechanical, pneumatic, or hydraulic clamping mechanism or by placing weights on the top 22 to apply increased hydrostatic pressure to the polymer resin mixture, driving the resin to infiltrate the fiberglass reinforcements 12, 14, 18 and helping to drive air bubbles out of the matrix. According to another embodiment, instead of closing mold cavity 10, the cavity is left open and the polymer resin mixture is allowed to harden while being exposed to air.

According to one embodiment, the polymer mixture includes a thermoset polymer such as a polyester resin. The resin includes a hardener component that is mixed with the resin prior to pouring the mix into the mold cavity to initiate a chemical reaction to cause the mix to solidify.

According to one embodiment, the resin is an unsaturated polyester resin sold as Polynt™ 768-6871 by Polynt SpA. This resin is a low viscosity (100 cps) resin, promoted using cobalt octuate and dimethylaniline and cured using a methyl ethyl ketone peroxide (mekp). According to other embodiments the polymer resin is an unsaturated polyester promoted solely with anilines and cured using benzoyl peroxide (bpo). According to further embodiments, the resin is a methacrylate, a vinyl ester, or an epoxy. Such resins can be cured using the above-mentioned metal salt/peroxide and/or aniline/peroxide systems already mentioned, and/or using heat-activated or UV curing systems.

According to one embodiment, the resin is used neat. According to other embodiments, a filler is added to the polymer resin such as limestone aggregate, silica sand, chopped fiberglass fibers, polymer fibers, metallic fibers, fly ash, and/or combinations thereof. According to a preferred embodiment, the filler comprises expanded glass beads instead of, or in addition to other fillers such as limestone aggregate. According to one embodiment, the filler is entirely expanded glass beads and comprises from 20% to 80% by weight of the polymer mix. According to a more preferred embodiment, the glass beads comprise between 40% and 70% by weight of the polymer mix. According to a most preferred embodiment, the glass beads comprise 55% by weight of the polymer mix. According to a preferred embodiment, the glass bead filler is manufactured by Dennert Poraver GmbH with a particle size of from 0.04 mm to 8.0 mm and have an apparent density from 20 to 60 lb/cubic foot, depending on the particle size. According to a further embodiment, instead of expanded glass beads, the filler comprises other lightweight materials such as expanded ceramic spheres or particles.

Figure 3:
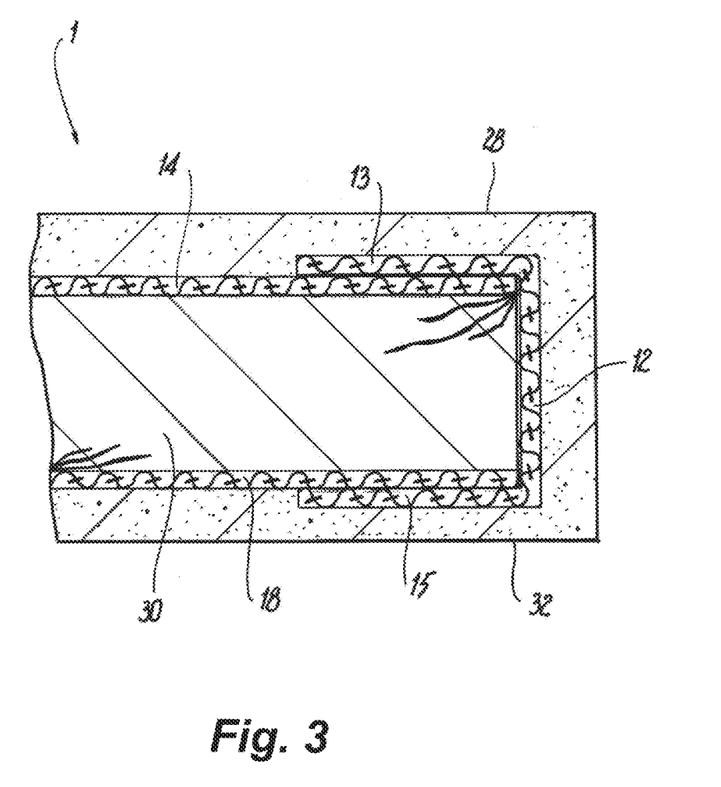

FIG. 3 shows a detailed view of the edge of cover 1 after the polymer mixture has hardened and the cover has been removed from the mold and oriented upright. Top reinforcement 14 lies within a matrix 26 of hardened polymer resin mixture on top of core 30 and below the top surface 28 of the cover. Bottom reinforcement 18 lies below the bottom surface of core 30 and above the bottom surface 32 of the cover. The hardened polymer mixture, which has infiltrated reinforcement 14 and overlapping portion 13 bonds the fibers of these together. Likewise overlapping portion 15 and bottom reinforcement 18 are bonded together. Top, edge, and bottom reinforcements 14, 12, 18 are bonded to the surfaces of core 30.

Other structures can be embedded in the polymer matrix or positioned within the core 30 during assembly of cover 1. For example, RFID circuitry can be provided in the cover to enable workers to identify the location and contents of a vault or trench using an electronic sensor. Cover 1 may include circuitry that interfaces with a meter housed in the vault to allow workers to remotely monitor the quantity of electricity, water, or gas used by a utility customer. Induction coils for monitoring the location and speed of vehicles in the vicinity of a vault can be provided to facilitate operation of traffic control devices, e.g., stoplights.

Figure 4A:
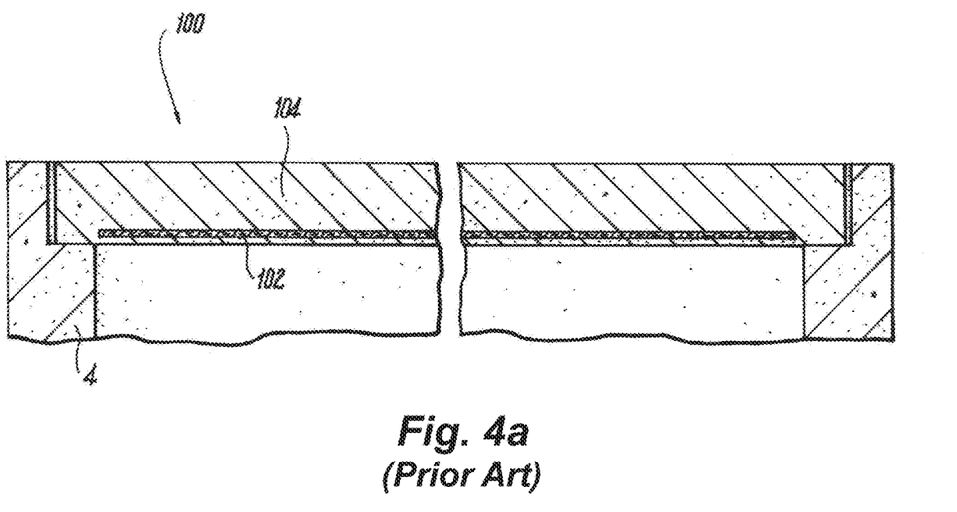
FIG. 4a is a cross section showing a prior art cover installed on a vault without a load applied.
Figure 4B:
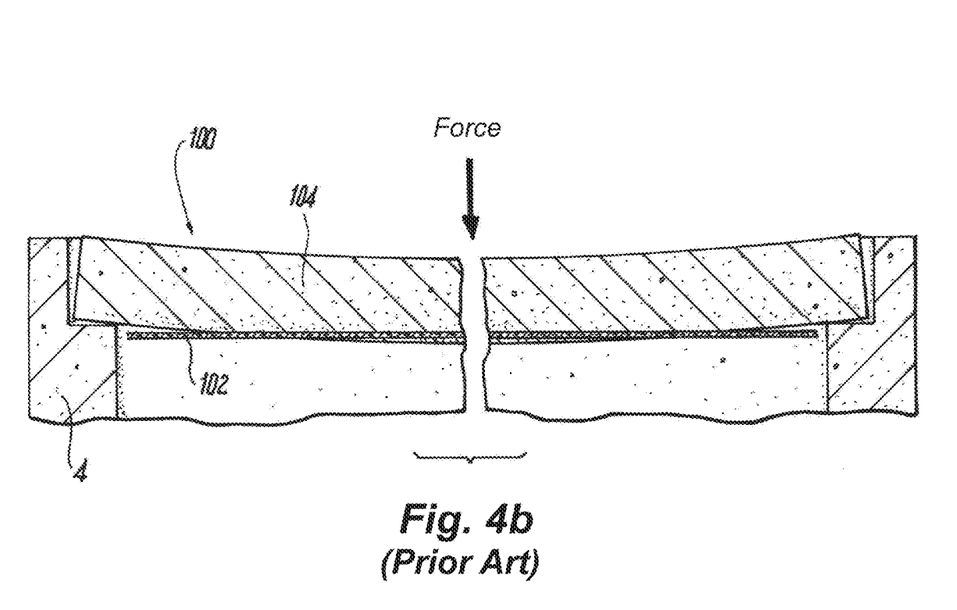
FIG. 4b shows the prior art cover of FIG. 4a with a load applied to its top surface.

FIGS. 4a and 4b illustrate a known vault cover 100. As shown in FIG. 4a, cover 100 includes a bottom reinforcement 102 embedded in a molded polymer matrix 104. The reinforcement 102 may be a fiberglass fabric infiltrated with the polymer matrix 104. Cover 100 may be installed on the shoulders 4 of a trench liner 6, such as the one shown in FIG. 1. FIG. 4b shows cover 100 with a force F applied to the top of the cover. Such a force may be the result of a vehicle or other heavy object on top of the cover. Because cover 100 is supported along its edges by shoulders 4, downward force will cause cover 100 to flex with the bottom surface in tension. Because reinforcement 102 impregnated with the solidified polymer is stiff, it tends to pull away from the bottom of the cover 100 and delaminate. As a result, the cover 100 loses strength and may collapse, potentially causing damage to the vault and any equipment resident in the vault.

Figure 5:
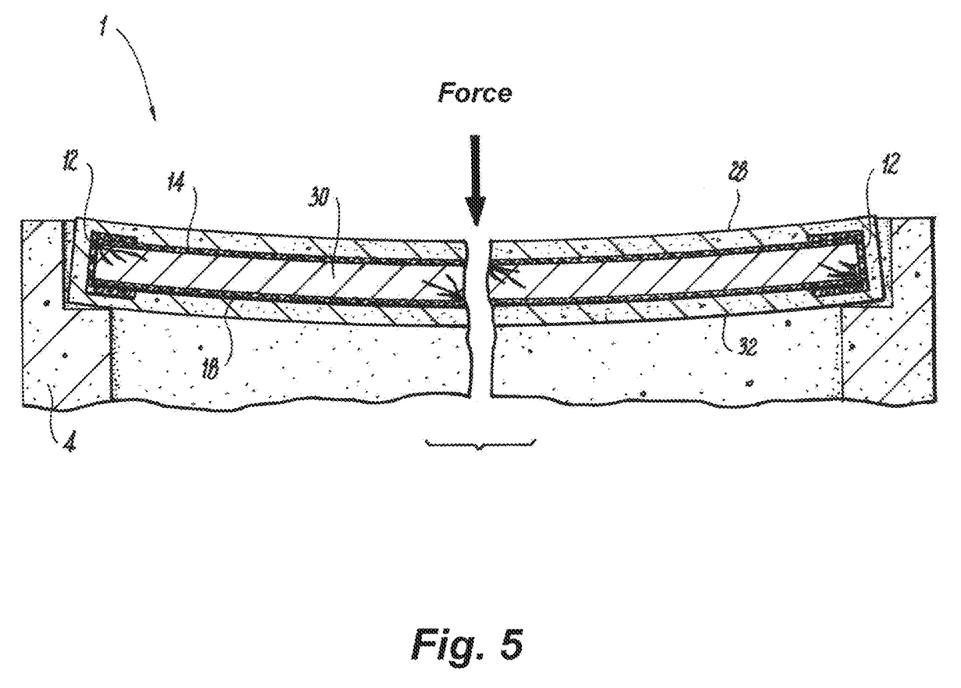
FIG. 5 is a cross section of a cover according to an embodiment of the disclosure installed on a vault with a load applied to its top surface.

FIG. 5 shows cover 1 according to the present disclosure installed within the shoulders 4 of a trench liner 6 with downward force F applied. Here, because the edge reinforcements 12 are bonded with the bottom reinforcement 18 at each edge of the cover, the bottom reinforcement does not delaminate from the cover. Instead, tensile forces along the bottom surface 30 of the cover 1 are communicated to the edge reinforcements and then through the thickness of the cover to the top reinforcement 14. In addition, because the edge reinforcements 12 are formed from a quadraxial fabric with fibers aligned in different directions (i.e., at 0°, 90°, −45°, +45°), any tensile force applied to the edge reinforcements will be in a direction no more than 22.5° from the axis of fibers in at least one layer. Likewise, in embodiments where bottom reinforcement 18 is also formed from a quadraxial fiberglass fabric, tensile forces along the bottom surface 30 of the cover will likewise be substantially aligned with at least one layer of the fibers and tensile forces will be communicated from the bottom surface 30 to the edges and through the thickness of the cover 1. In addition, because reinforcements 12, 14, 18 are each bonded to core 30, tensile forces along bottom surface 32 and compressive forces along top surface 28 are distributed through the bulk of the cover.

FIGS. 6a-6f show a further embodiment of the disclosure. Elements common to the above described embodiments will be identified with the same numerals. As shown in the exploded view of FIG. 6a, cover 1 is formed from a core 30 with top and bottom reinforcements 14, 18 along the top and bottom surfaces of the core. Edge reinforcements 12 are provided around the edges of core 30 and overlap edges of the top and bottom reinforcements. In this embodiment, infiltration mats 34 and 36 are positioned over the top and bottom reinforcements.

Figure 6A:
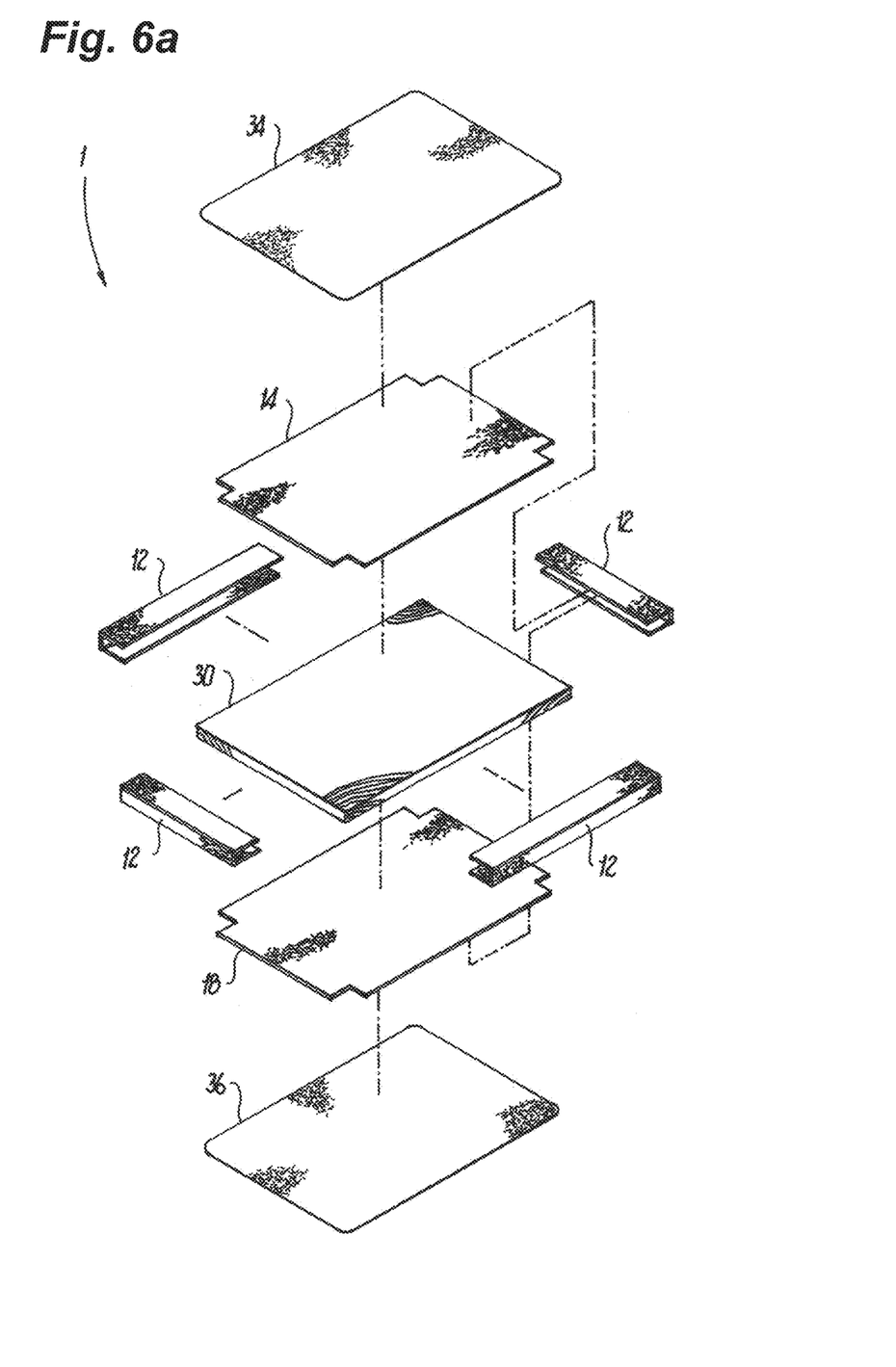
FIG. 6a is an exploded view of a cover according to an additional embodiment of the disclosure.

According to one embodiment, the core is formed from a low-density material, for example, end grain balsa and reinforcements are formed from fiberglass fabrics, such as 48 oz. quadraxial (0°, 90°, −45°, 45°) fabric as in the previous embodiments. Infiltration mats may be formed from a variety of open structured fibrous materials, such as fiberglass chopped strand mat. According to one embodiment, in addition to infiltration mats, one or more layers of a flow enhancing material, such as Rovicore™ manufactured by Chomarat may be provided to facilitate distribution of resin through the mold cavity, as will be described below. The core, reinforcements, and infiltration mats are embedded in a polymer matrix as will be explained below.

Figure 6B:
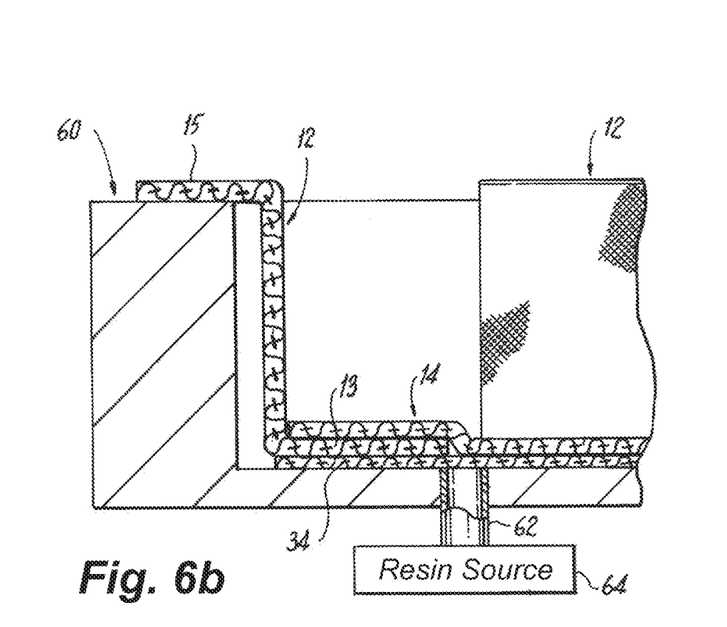

FIG. 6b is a cross section showing a portion of a mold 60. Connected with the bottom of the mold 60 is a resin inlet port 62. Inlet port 62 is connected with resin source 64, which is part of a Light Resin Transfer Molding (LRTM) system, as will be explained below. According to other embodiments, additional inlet ports may be provided, depending on the shape and configuration of the cover being formed. The inlets may be connected via a manifold to a single resin source 64. The location of the inlet ports is selected based on the shape of the cover being assembled and may vary depending on the size of the cover, the location of structures such as lifting pins and bolt holes, and other factors that influence the flow of resin in the mold cavity. According to other aspects of the invention, inlet ports may be provided on the sides and/or top of the mold cavity in addition to or in lieu of inlet ports on the bottom of the mold cavity Infiltration mat 34 is placed on the bottom surface of the mold 60. The mat 34 is sized to substantially cover the entire bottom surface of mold 60. Edge reinforcement 12 is placed in the mold, with a first portion 13 lying on top of mat 34 and a second portion extending out of the mold and lying on the side of the mold. Top reinforcement 14 is placed in the mold 60 with its edges overlying portion 13 of the edge reinforcement.

Figure 6C:
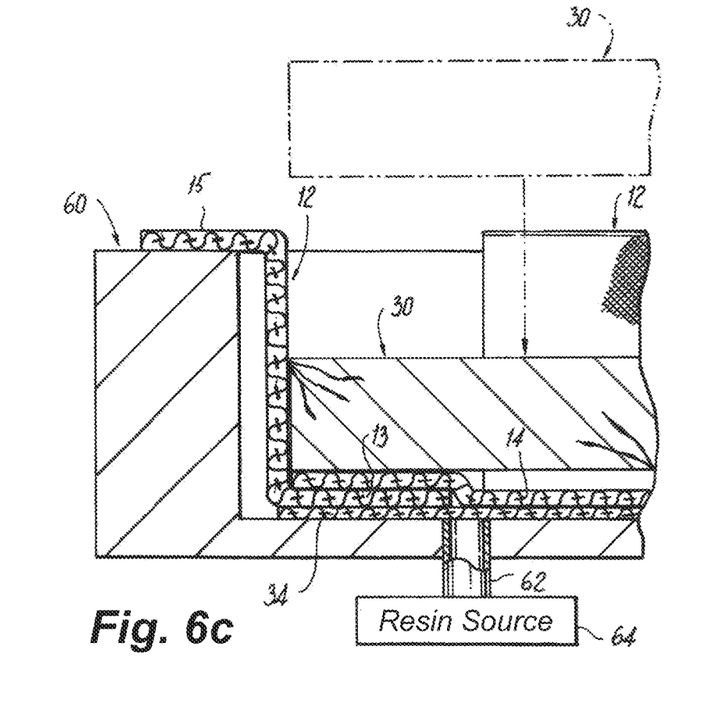

As shown in FIG. 6c, core 30 is placed in the mold 60 on top of top reinforcement 14. Core 30 is shaped to fit within the mold with a predetermined clearance between the edges of core 30 and the sides of mold 60.

Figure 6D:
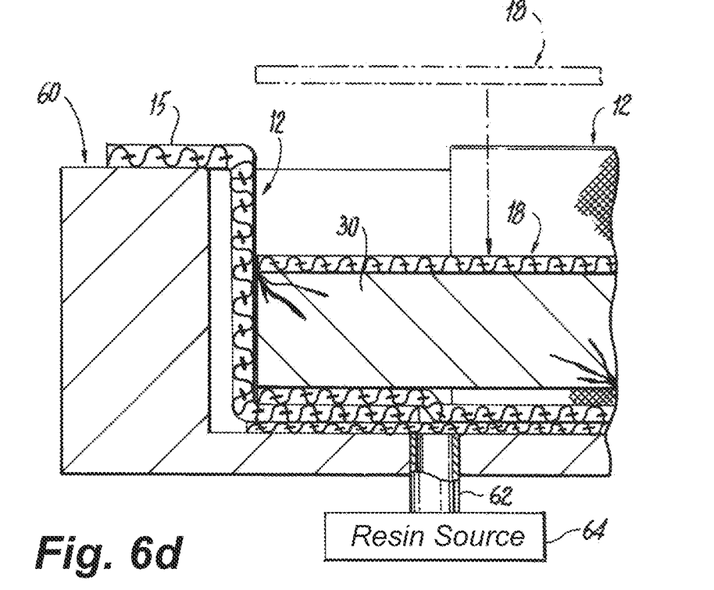
Figure 6E:
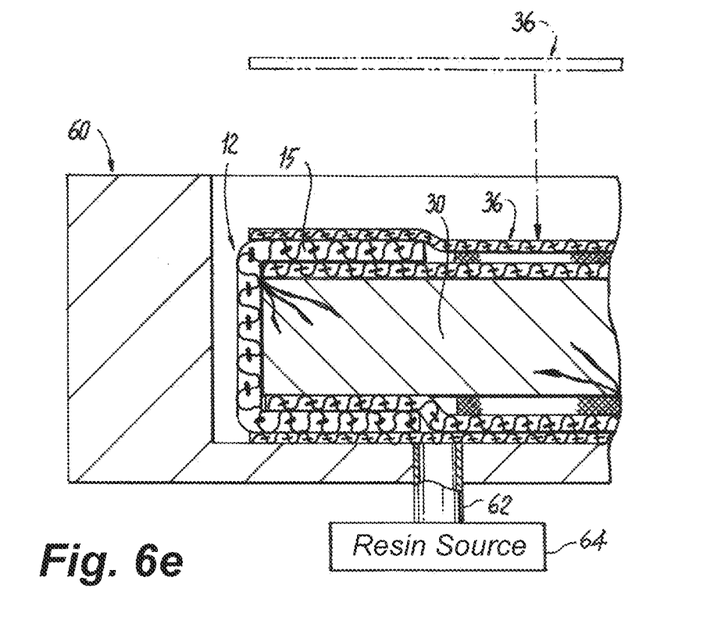

As shown in FIG. 6d, bottom reinforcement 18 is placed in mold 60 on top of core 30. As shown in FIG. 6e, second portion 15 of edge reinforcement 12 is folded over into mold 60 and lies atop bottom reinforcement 18. Infiltration mat 36 is placed on top of second portion 15 of the edge reinforcement 12 and bottom reinforcement 18.

Figure 6F:
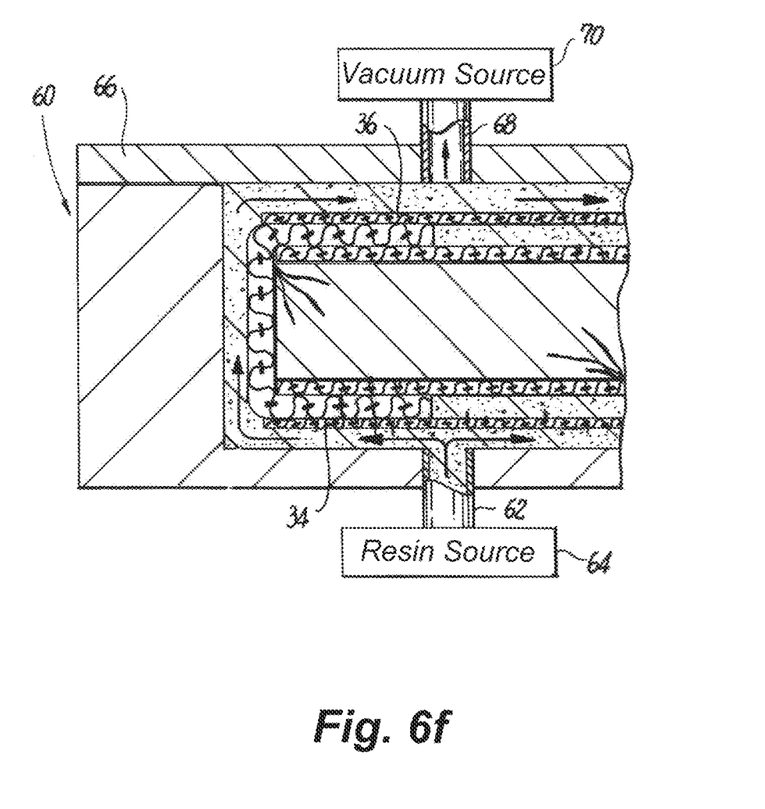

As shown in FIG. 6f, the top of the mold 66 is closed over the mold cavity 60 and forms an airtight seal. To enhance sealing between mold 60 and top 66, the top may be made from a flexible material (e.g., silicone) or may include a resilient gasket to form a seal. The top of the mold 66 includes a vacuum outlet port 68. According to one embodiment, outlet port 68 is provided near the center of the cover. According to other embodiments, the location of outlet port 68 is selected based on the shape of the mold. The outlet port 68 is connected with the vacuum source 70 of the LRTM system. Resin is pumped into the mold 60 by resin source 64 through inlet port 62, while vacuum is applied to vacuum outlet port 68 by vacuum source 70. Resin flows into the mold cavity and infiltrates reinforcements 12, 14, 18 as well as infiltration mats 34, 36. According to some embodiments, core 30 is provided with holes that facilitate resin infiltrating into the core. Infiltration mats 34, 36 provide resistance to the flow of the resin, causing it to spread throughout the mold cavity and complete fill spaces surrounding the core. Once the resin hardens the cover is removed from the mold.

The resin may be one of a variety of resins suitable for LRTM including low viscosity polyester resins, such as the resin used in the embodiment described with respect to FIGS. 2a-2f.

According to the embodiments of the disclosure, the top, bottom, and edge reinforcements and the core embedded in a polymer resin matrix using other molding techniques including Resin Transfer Molding (RTM) and vacuum bag molding.

While illustrative embodiments of the disclosure have been described and illustrated above, it should be understood that these are exemplary of the disclosure and are not to be considered as limiting. Additions, deletions, substitutions, and other modifications can be made without departing from the spirit or scope of the disclosure. Accordingly, the disclosure is not to be considered as limited by the foregoing description.

We claim:

1. A vault cover comprising:
   a bottom reinforcement layer extending, at least partially along a first horizontal plane;
   at least one edge reinforcement layer, a middle portion of the edge reinforcement layer disposed proximate to an edge of the vault cover, wherein a first fold connects a first portion of the edge reinforcement layer with the middle portion and wherein a second fold connects a second portion of the edge reinforcement layer with the middle portion;
   a core, wherein the core comprises balsa wood, wherein the bottom reinforcing layer extends along a first major surface of the core and terminates within edges of the first major surface;
   a top reinforcement layer extending, at least partially along a second horizontal plane substantially parallel with the first horizontal plane, wherein the top reinforcing layer extends along a second major surface of the core and terminates within edges of the second major surface, and wherein the core is positioned between the bottom reinforcement layer and the top reinforcement layer; and
   a polymer resin matrix, wherein the polymer resin matrix comprises a polymer resin and a filler, wherein the filler comprises expanded glass beads, and wherein the polymer resin matrix comprises about 20% to about 80% by weight of expanded glass beads,
   wherein an edge portion of the top reinforcement layer is positioned adjacent to the core, wherein the first portion of the edge reinforcement layer overlaps the edge portion of the top reinforcement layer on a side of the edge portion of the top reinforcement layer opposite from the core, wherein the second portion of the edge reinforcement layer extends from the middle portion inward from the edge of the vault cover along the first horizontal plane and wherein an edge portion of the bottom reinforcement layer is positioned adjacent to the core, wherein the second portion of the edge reinforcement layer overlaps the edge portion of the bottom reinforcement layer on a side of the edge portion of the bottom reinforcement layer opposite from the core, wherein the edge reinforcement layer is continuous from the first portion, through the middle portion to the second portion.

2. The vault cover of claim 1, wherein one or more of the top reinforcement layer, the bottom reinforcement layer and the edge reinforcement layer are a fiberglass fabric.

3. The vault cover of claim 2, wherein the fiberglass fabric comprises a quadraxial fabric.

4. The vault cover of claim 1, wherein the balsa wood comprises end grain balsa wood.

5. The vault cover of claim 4, wherein the end grain balsa wood has a density between 9 and 15 pounds per cubic foot.

6. The vault cover of claim 1, wherein the balsa wood comprises drill holes and wherein the polymer resin matrix is incorporated into the core via the drill holes.

7. The vault cover of claim 1 adapted to cover one or more of a trench, a vault, a manhole, and an opening in a roadway.

8. The vault cover of claim 1 further comprising a lifting pin or lifting handle.

9. The vault cover of claim 1, wherein the filler further comprises one or more of limestone aggregate, silica sane, chapped fiberglass fibers, polymer fibers, metallic fibers, fly ash, expanded ceramic spheres, and ceramic particles.

10. The vault cover of claim 1, wherein the polymer resin matrix comprises about 40% to about 70% by weight of expanded glass beads.

11. The vault cover of claim 10, wherein the polymer resin matrix comprises 50% by weight of expanded glass beads.

12. A vault cover comprising:
    a bottom reinforcement layer extending, at least partially along a first horizontal plane;
    at least one edge reinforcement layer, a middle portion of the edge reinforcement layer disposed proximate to an edge of the vault cover, wherein a first fold connects a first portion of the edge reinforcement layer with the middle portion and wherein a second fold connects a second portion of the edge reinforcement layer with the middle portion;
    a core, wherein the core comprises balsa wood, wherein the bottom reinforcing layer extends along a first major surface of the core and terminates within edges of the first major surface;
    a top reinforcement layer extending, at least partially along a second horizontal plane substantially parallel with the first horizontal plane, wherein the top reinforcing layer extends along a second major surface of the core and terminates within edges of the second major surface, and wherein the core is positioned between the bottom reinforcement layer and the top reinforcement layer; and
    a polymer resin matrix, wherein the polymer resin matrix comprises a polymer resin and a filler, wherein the filler comprises expanded glass beads,
    wherein an edge portion of the top reinforcement layer is positioned adjacent to the core, wherein the first portion of the edge reinforcement layer overlaps the edge portion of the top reinforcement layer on a side of the edge portion of the top reinforcement layer opposite from the core, wherein the second portion of the edge reinforcement layer extends from the middle portion inward from the edge of the vault cover along the first horizontal plane and wherein an edge portion of the bottom reinforcement layer is positioned adjacent to the core, wherein the second portion of the edge reinforcement layer overlaps the edge portion of the bottom reinforcement layer on a side of the edge portion of the bottom reinforcement layer opposite from the core, wherein the edge reinforcement layer is continuous from the first portion, through the middle portion to the second portion.

* * * * *